United States Patent [19]

Suzuki

[11] Patent Number: 4,477,626

[45] Date of Patent: Oct. 16, 1984

[54] POLYORGANOSILOXANE COMPOSITIONS

[75] Inventor: Toshio Suzuki, Yushudainishi, Japan

[73] Assignee: Toray Silicone Co., Ltd., Tokyo, Japan

[21] Appl. No.: 587,330

[22] Filed: Mar. 7, 1984

[30] Foreign Application Priority Data

Mar. 25, 1983 [JP] Japan .................................. 58-50158

[51] Int. Cl.³ .............................................. C08L 83/04
[52] U.S. Cl. .................................... 524/862; 524/865; 528/15; 528/31; 528/32
[58] Field of Search ............................. 528/15, 31, 32; 524/862, 865

[56] References Cited

U.S. PATENT DOCUMENTS 3,284,406 11/1966 Nelson .................................. 528/15
4,100,627 7/1978 Brill ..................................... 528/10

Primary Examiner—Melvyn I. Marquis
Attorney, Agent, or Firm—Robert Spector

[57] ABSTRACT

A desirable thixotropic character is imparted to a curable liquid composition comprising a vinyl-containing polyorganosiloxane, a polyorganosiloxane containing at least two silicon-bonded hydrogen atoms per molecule, a platinum-containing catalyst and a finely divided silica filler by including in said composition from 0.05 to 10%, based on the weight of said composition, of a polyorganosiloxane wherein each molecule contains at least 0.5% by weight of hydroxyl groups.

12 Claims, No Drawings

POLYORGANOSILOXANE COMPOSITIONS

BACKGROUND OF THE INVENTION

1. Field of the Invention

This invention relates to polyorganosiloxane compositions. More particularly, this invention relates to liquid polyorganosiloxane compositions exhibiting improved flow properties and workability and which cure to form a gel.

2. Description of the Prior Art

Liquid polyorganosiloxane compositions that cure to form gel materials when cured by the reaction of silicon-bonded hydrogen atoms with vinyl radicals are known in the art. Compositions of this type are disclosed, for example, in U.S. Pat. No. 3,284,406, which issued to M. Nelson on Nov. 8, 1966, and in U.S. Pat. No. 4,100,627, which issued to A. E. Brill on July 18, 1978. The flow properties of prior art gel-forming compositions could make them difficult to use in a coating operation. Those compositions exhibiting low viscosities in the uncured state are easily applied as coating materials, however relatively thick films cannot be readily achieved in a single application due to the highly flowable nature of the compositions. At the other extreme, high viscosity compositions would be difficult to apply as thin, continuous, uniform films. For certain end uses requiring coating of selected small areas on a substrate, coating of electrical wires, or the application of relatively thick coatings, it is desirable that the gel-forming polyorganosiloxane composition exhibit a low viscosity during application and a low degree of flowability after application.

This invention provides an ideal gel-forming polyorganosiloxane composition for coating operations in which the above-mentioned shortcomings of conventional gel-forming polyorganosiloxane compositions are improved. In other words, according to this invention, the uncured polyorganosiloxane is thixotropic, in that it is characterized by a low apparent viscosity under shear stress, also referred to as shear deformation stress, during application, and by a high post-application apparent viscosity in the absence of shear stress. Following curing, the composition is a soft gelled elastic material.

SUMMARY OF THE INVENTION

A desirable thixotropic character is imparted to gel-forming liquid polyorganosiloxane compositions comprising a vinyl-containing polyorganosiloxane, a polyorganosiloxane containing at least two silicon-bonded hydrogen atoms per molecule, a platinum-containing catalyst, and a finely divided silica filler by including in the composition from 0.05 to 10%, based on the weight of said composition, of a polyorganosiloxane wherein each molecule contains at least 0.5% by weight of hydroxyl groups.

DETAILED DESCRIPTION OF THE INVENTION

This invention relates to a curable, thixotropic, liquid polyorganosiloxane composition comprising the product obtained by mixing (A) a polyorganosiloxane containing at least two vinyl radicals per molecule and represented by the average unit formula $$R_a SiO_{(4-a)/2},$$

where at least 50 mole % of the radicals represented by R are methyl, the remainder being selected from the group consisting of unsubstituted hydrocarbon radicals other than methyl, alkoxy, and substituted monovalent hydrocarbon radicals where the substituent is selected from the group consisting of acryloxy, methacryloxy, chlorine, and fluorine, and the value of a is from 1.8 to 2.2, inclusive; (B) a polyorganosiloxane containing at least two silicon-bonded hydrogen atoms per molecule and represented by the average unit formula $$R_b^1 SiO_{(4-b)/2},$$

where $R^1$ is selected from the group consisting of monovalent unsubstituted monovalent hydrocarbon radicals, hydrogen, alkoxy, and substituted monovalent hydrocarbon radicals wherein the substituent is selected from acryloxy, methacryloxy, chlorine, and fluorine, the value of b is from 1.5 to 2.5, inclusive, and the molar ratio of silicon-bonded hydrogen atoms in (B) to vinyl radicals in (A) is from 0.2 to 5, inclusive; (C) an amount of a platinum-containing catalyst equivalent to from 0.1 to 200 parts by weight of platinum per million parts of combined weight of (A) and (B); (D) from 0.5 to 50 weight %, based on the combined weight of (A) and (B), of fine silica powder; and (E) from 0.05 to 10 weight %, based on the combined weight of ingredients (A) through (D), of a polyorganosiloxane containing at least 0.5 weight percent of hydroxyl groups per molecule and represented by the average unit formula $$R_c^2 SiO_{(4-c)/2},$$

where the value of c is from 1.8 to 3.0, $R^2$ is selected from the group consisting of monovalent hydrocarbon radicals, methoxy, ethoxy, substituted alkyl radicals wherein the substituent is selected from the group consisting of chlorine, fluorine and hydroxyl, and radicals of the formula $$-R^3(OC_2H_4)_x(OC_3H_6)_y OH,$$

where $R^3$ is alkylene, and the values of x and y are from 0 to 30, inclusive, with the proviso that the sum of x and y is at least 1, and that (E) contains a number of silicon-bonded hydroxyl groups sufficient to provide a total of at least 0.5 percent by weight of hydroxyl groups per molecule of (E) in combination with any hydroxyl groups present in $R^2$. The present compositions cure to form gels exhibiting a penetration of from 8 to 50 mm.

Components (A) and (B) together constitute the major portion of the present curable compositions. Under the catalytic action of component (C), an addition reaction occurs between components (A) and (B) to form a gelled, elastic material. Component (A) can be represented by the average unit formula $$R_a SiO_{4-a/2}.$$

R represents a monovalent radical as defined hereinbefore. At least 50% of the radicals represented by R are methyl, and component (A) contains at least two vinyl radicals per molecule. Any remaining R radicals can be unsubstituted hydrocarbon radicals or substituted hydrocarbon radicals where the substituent is acryloxy, methacryloxy, chlorine, or fluorine. R can also represent an alkoxy group. Typical R radicals other than methyl include alkyl such as ethyl and propyl, alkenyl such as vinyl and allyl, substituted alkyl such as 3-methacryloxypropyl, 3-acryloxypropyl, 3-chloropropyl, and 3,3,3-trifluoropropyl. Many different R radicals can be present in the same molecule.

In order to obtain a good gelled elastic material, at least 50 mol % and preferably at least 70 mol % of the R radicals must be methyl. The value of a is between 1.8 and 2.2 inclusive, and preferably between 1.95 and 2.05. The vinyl radicals present in component (A) can be present either at the molecular chain ends or in branch chains, and are not necessarily bonded directly to silicon. The molecular weight of component (A) is not limited; however, in order to obtain an uncured composition with good application qualities, it is desirable that the viscosity at 25° C. be from 0.05 to 50 Pa·s.

Component (B) is a polyorganosiloxane containing at least 2 silicon-bonded hydrogen atoms per molecule and is represented by the average unit formula $$R_b^1SiO_{(4-b)/2}.$$

The molecular structure can be a straight chain, branched chain, cyclic, or a crosslinked network. In the foregoing formula, $R^1$ represents hydrogen or any of the radicals listed hereinbefore in connection with the R radical of component (A). Many different $R^1$ radicals can be present in the same molecule. Although no specific restriction is imposed on the proportion of methyl groups in $R^1$, at least 50 mol % is preferred to achieve compatibility with component (A). The value represented by b is between 1.5 and 2.5 and preferably between 1.8 and 2.2 in order to obtain a good gelled elastic material. Silicon-bonded hydrogen atoms may be located either at the molecular chain ends, along the main chain, or in branch chains. Although there is no specific restriction on the molecular weight of component (B), a viscosity of from 0.001 to 50 Pa·s at 25° C. is preferred to obtain good application qualities.

The concentration of component (B) should provide a molar ratio of silicon-bonded hydrogen atoms in (B) to vinyl radicals in component (A) of from 0.2:1 to 5:1. The following molar ratios are preferred for obtaining good gelled elastic materials: 1:1 for 2 vinyl groups per molecule of component (A) and 2 silicon-bonded hydrogens per molecule of component (B); from 0.2:1 to 0.8:1 for 2 vinyl groups per molecule of component (A) and 3 or more silicon-bonded hydrogens per molecule of component (B); and from 1.3:1 to 5:1 for 3 or more vinyl groups per molecule of component (A) and 2 silicon-bonded hydrogen atoms per molecule of component (B). Although this is not definitive, molar ratios of from 0.2:1 to 0.8:1 for 2 or more vinyl groups per molecule of component (A) and 3 or more silicon-bonded hydrogens per molecule of component (B) are generally recommended.

Component (C) is a curing catalyst for the addition reaction between components (A) and (B) and comprises platinum or a platinum compound. Examples are fine platinum powder, fine powdery platinum on a support, platinum black, chloroplatinic acid, sodium chloroplatinate, potassium chloroplatinate, platinum tetrachloride, alcohol-modified chloroplatinic acid, olefin complexes with chloroplatinic acid, complexes of chloroplatinic acid and alkenylsiloxanes and diketone chelates of platinum.

The amount of component (C) present is equivalent to from 0.1 to 200 parts by weight of platinum per 1,000,000 parts by weight (ppm) of the total components (A) and (B). At below 0.1 ppm, curing is inadequate while exceeding 200 ppm does not produce any beneficial effect and is uneconomical.

Component (D), a fine silica powder, is a very important component which when combined with component (E) can produce the desired flow properties in the uncured composition. Examples of the fine silica powder include, but are not limited to synthetic amorphous silica obtained by fuming or precipitation, natural amorphous silica and these silicas whose surfaces have been hydrophobicized. In order to obtain stable flow properties over the long term, it is preferable to hydrophobicize the surface of the silica using, for example hexamethyldisilazane, trimethylchlorosilane, dimethyldichlorosilane, methyltrichlorosilane, methyltrimethoxysilane, or cyclic polydimethylsiloxanes.

There is no restriction on the particle size of the silica powder. Powder with a primary particle size of from 0.05 to 0.1 m, and particularly with a specific surface of 30 m²/g or more, is generally available, and can be used in this invention to obtain the desired flow properties. From 0.5 to 50 percent by weight of component (D) are added, based on the combined weight of components (A) and (B). At below 0.5 percent by weight, the viscosity of the composition is too low. On the other hand, exceeding 50 percent by weight will result in too high a viscosity and will impede application operations.

Component (E) is the component which when combined wih component (D) can produce thixotropy. This component is a polyorganosiloxane containing at least 1 hydroxyl group per molecule that constitutes at least 0.5 wt. % of the molecule. Component (D) is represented by the average unit formula $$R_c^2SiO_{(4-c)/2}.$$

$R^2$ has been defined hereinabove. Typically $R^2$ can represent alkyl radicals such as methyl, ethyl and propyl; alkenyl radicals such as vinyl and allyl; aryl radicals such as phenyl; halogenated alkyl radicals such as 3,3,3-trifluoropropyl and 3-chloropropyl; alkoxy groups such as methoxy and ethoxy; hydroxyalkyl groups such as 2-hydroxyethyl, 3-hydroxypropyl, and 4-hydroxybutyl; and hydroxyl-containing groups such as —$R^3$—$(OC_2H_5)_x$—$(OC_3H_6)_y$—OH, where $R^3$ is an alkylene group and x and y are integers from 0 to 30. The sum of x and y is at least one and the sequence of repeating units is not restricted. When $R^2$ represents a hydroxyalkyl group or other hydroxyl-containing group, these groups can be present alone or in combination with one or more of the other radicals defined hereinabove for $R^2$.

If $R^2$ does not provide at least 0.5% by weight of hydroxyl groups per molecule, component (E) must contain a number of silicon-bonded hydroxyl groups sufficient to meet this requirement. Although there is no restriction on the number of $R^2$ radicals that represent methyl, from a consideration of compatability with component (A), at least 50 mol % methyl is preferred. The value of c is from 1.8 to 2.2 and preferably from 1.9 and 2.1.

Examples of component (E) include, but are not limited to

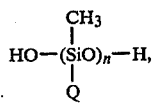

where n is a number between 1 and 90 and Q is CH$_3$, C$_6$H$_5$, —CH=CH$_2$, or CH$_2$CH$_2$CF$_3$;

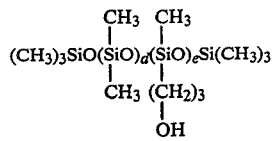

where d and e are integers from 1 to 500, inclusive;

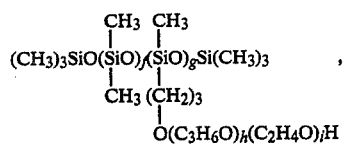

where f and g are integers from 1 to 500, inclusive, h and i are integers from 0 to 30, inclusive, and the sum of h and i is at least 1;

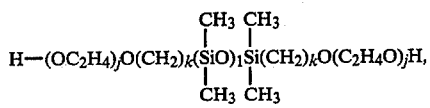

where j and k are integers from 1 to 30, inclusive, and 1 is an integer from 1 to 90, inclusive.

From 0.05 to 10 percent by weight of component (E) is added, based on the combined weight of components (A) through (D). At below 0.5 percent by weight, an adequate degree of thixotropy will not be produced. Exceeding 10 percent by weight will unfavorably affect the addition reaction between components (A) and (B). A concentration of from 1 to 2 parts by weight is preferred. This component can be a single ingredient or a mixture.

In addition to components (A) through (E), the present curable compositions can contain colorants such as red iron oxide and cobalt oxide, inorganic fillers such as silica powder other than specified herein for component (D), calcium carbonate, aluminum hydroxide, alumina, clay, diatomaceous earth, titanium oxide, cerium oxide, and carbon black; diluents such as inert silicon oil and organic solvents, and inhibitors such as benzotriazole and acetylenic alcohols. The only limitation on the foregoing optional ingredients is that the cured composition has a penetration of from 8 to 50 mm. The penetration values are obtained using the meter and probe described in JIS (Japan Industrial Standard) K 2808. The values were measured at 25° C. using a 5 second measurement period. The load, including the probe and holder, was B 50.5 g. Penetration is specified at from 8 to 50 mm because less than 8 mm is equivalent to a rubbery material instead of a gel and above 50 mm is equivalent to a liquid. For general protective coatings, a penetration of from 10 to 30 mm is preferred.

The curable polyorganosiloxane composition of this invention, as mentioned above, is a viscous liquid substance which is thixotropic before curing and is easily applied. It becomes an elastic gel with penetration of 8 to 50 mm after curing. By exploiting these properties, the present compositions are useful for the protective coating of electric or electronic parts, for the water-resistant coating of semiconductor chips, for the protective coating of electric wires and optical glass fibers, for the coating of rollers to clean the dust from records; etc. The following examples further explain this invention. Quantities expressed in parts and percents are by weight, and the viscosities were measured at 25° C.

EXAMPLE 1

A composition containing 100 parts of a dimethylvinylsiloxy endblocked polydimethylsiloxane exhibiting a viscosity of 2 Pa·s at 25° C. and a vinyl content of 0.24%, 20 parts fumed silica that had been surface treated using hexamethyldisilazane and exhibited a specific surface area of 200 m$^2$/g, 1 part of a 2% 2-ethylhexanol solution of chloroplatinic acid, 0.49 parts of a dimethylsiloxane-methylhydrogensiloxane copolymer wherein the dimethylsiloxane unit: methylhydrogensiloxane unit molar ratio was 3.5, the viscosity was 0.005 Pa·s and the concentration of silicon-bonded hydrogen atoms was 0.73%, and 0.01 part 1-methyl-3-butyn-1-ol were mixed in a planetary mixer to homogeneity to produce Composition I. The hydroxyl-containing polyorganosiloxanes listed in the following Table 1 were added to Composition I to prepare the curable compositions identified as Experiments 1-7. Experiment 8 did not contain any hydroxylated polyorganosiloxane.

These mixtures were applied to a 0.5 mm OD copper wire by dipping. The coated wires were maintained in a horizontal position in a 100° C. atmosphere. The thickness of the cured gel layer as well as the surface uniformity after 15 minutes of heating are reported in Table 1.

In Table 1, the term "amount added" refers to the amount of siloxane added to Composition I. Surface uniformity was rated using the following scale.

+: good
o: extremely small nonuniformity
x: nonuniform overall, appearance of beads on a string.

Cured gels formed from compositions numbered 1 to 8 all had penetration values of 14-15 mm.

TABLE 1

| | Copper Wire Coating Experiment | | | |
|---|---|---|---|---|
| Experiment No. | Siloxane Added | Amount Added (%) | Coating Thickness (mm) | Surface Uniformity |
| 1 (Invention) | CH$_3$<br>\|<br>HO—(SiO)$_8$—H<br>\|<br>CH$_3$ | 0.5 | 0.15 | o |
| 2 (Invention) | Same as above | 1.0 | 0.27 | + |

TABLE 1-continued

Copper Wire Coating Experiment

| Experiment No. | Siloxane Added | Amount Added (%) | Coating Thickness (mm) | Surface Uniformity |
|---|---|---|---|---|
| 3 (Invention) | $HO{-}(SiO)_5{-}H$ with $CH_3$ and $C_6H_5$ substituents | 1.0 | 0.18 | o |
| 4 (Invention) | $(CH_3)_3SiO{-}(SiO)_{50}(SiO)_7{-}Si(CH_3)_3$ with $CH_3$, $CH_3$ substituents on first $SiO$ unit, and $CH_3$, $(CH_2)_3OH$ on second | 0.2 | 0.30 | o |
| 5 (Invention) | Same as above | 0.5 | 0.52 | + |
| 6 (Invention) | $(CH_3)_3SiO{-}(SiO)_{30}(SiO)_3Si(CH_3)_3$ with $CH_3$, $CH_3$ on first, and $CH_3$, $(CH_2)_3{-}O{-}(CH_2CHO)_2{-}H$ with $CH_3$ on second | 0.15 | 0.35 | + |
| 7 (Invention) | Same as above | 0.3 | 0.48 | + |
| 8 (Comparison) | None | — | 0.08–0.12 | x |

EXAMPLE 2

A composition containing 100 parts of a dimethylvinylsiloxy-endblocked dimethylsiloxane-methylphenylsiloxane copolymer in which the dimethylsiloxane unit:methylphenylsiloxane unit molar ratio was 10:1, the viscosity was 2 Pa·s and the vinyl content 0.20%; 20 parts fumed silica which had been surface treated using trimethylchlorosilane and exhibited a specific surface area of 130 m²/g; 1 part of a 2% 2-ethylhexanol solution of chloroplatinic acid; 6 parts of a dimethylsiloxane-methylhydrogen siloxane copolymer exhibiting a dimethylsiloxane unit:methylhydrogensiloxane unit molar ratio of 22:2, a viscosity of 0.025 Pa·s, and a silicon-bonded hydrogen content of 0.10%; and 0.01 part 1-methyl-3-butyn-1-ol was mixed in a planetary mixer to homogeneity. 0.3 part of a polyorganosiloxane of the formula

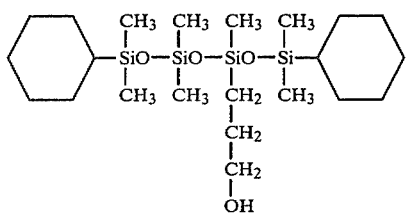

was added as the hydroxyl group-containing polyorganosiloxane and the composition was mixed. The resultant composition was applied by dipping to an optical fiber having a primer coating of resin. The coating was cured by maintaining the fiber in a horizontal position in a 300° C. atmosphere. After 1 minute, the thickness of the cured gel layer was measured as 0.25 mm and the surface uniformity was good. For comparison, the same experiment was carried out using a curable composition lacking the above-mentioned hydroxyl group-containing polyorganosiloxane. The cured coating thickness was 0.05–0.15 mm. The surface was nonuniform and had the appearance of beads on a string. Both cured compositions of this example exhibited a penetration value of 20–21 mm.

EXAMPLE 3

A mixture containing (1) 58 parts of a methyl(3,3,3-trifluoropropyl)vinylsiloxane-endblocked dimethylsiloxane-methylvinylsiloxane copolymer in which the dimethylsiloxy unit:methylvinylsiloxy unit molar ratio was 140:1, the viscosity was 0.4 Pa·s and the vinyl content was 0.76%, (2) 100 parts of a dimethylhydrogensiloxy-endblocked polydimethylsiloxane exhibiting a viscosity of 0.1 Pa·s and a silicon-bonded hydrogen content of 0.033%, (3) 25 parts fumed silica which had been surface treated using hexamethyldisilazane and exhibited a specific surface area of 300 m²/g, (4) 2 parts of a 2% 2-ethylhexanol solution of chloroplatinic acid and (5) 0.02 part 1-methyl-3-butyn-1-ol was blended in a kitchen mixer to homogeneity. 0.8 part of a polysiloxane with the formula

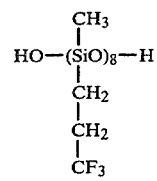

was then added as the hydroxyl group-containing polyorganosiloxane. After mixing, the resultant composition was placed on an aluminum plate and formed into a cylinder measuring 5.0 mm in diameter and 2 mm in height. The plate was maintained in a horizontal position while the cylinder cured in a 200° C. atmosphere. After 10 minutes, the diameter of the cured cylinder was measured as 5.2 mm. For comparison, the same experiment was carried out using a composition lacking the above-mentioned hydroxyl group-containing polyorganosiloxane. The diameter of the cured cylinder was found to have increased to 7.2 mm. In both instances the penetration value of the cured composition was 10–11 mm.

EXAMPLE 4

A mixture containing 100 parts of a dimethylvinylsiloxy-endblocked polydimethylsiloxane exhibiting a viscosity of 10 Pa·s and a vinyl content of 0.12%, and 3 parts of hexamethyldisilazane were blended in a planetary mixer. 15 parts fumed silica with a specific surface area of 200 m²/g were added gradually. After mixing to homogeneity, the pressure was reduced to 10 mm Hg with heating to 150° C. and the composition was stirred to remove residual hexamethyldisilazane and volatile reaction products. After the mixture had cooled to room temperature, 1.8 parts of a dimethylhydrogensiloxy-endblocked polydimethylsiloxane exhibiting a viscosity of 0.01 Pa·s and a silicon-bonded hydrogen content of 0.25%, 1 part of a 2% 2-ethylhexanol solution of chloroplatinic acid and 0.01 part benzotriazole were added and mixed to homogeneity. To this mixture was then added 0.5 part of a polysiloxane with the formula $$HO-(\underset{CH_3}{\underset{|}{Si}}O)_4(\underset{CH=CH_2}{\underset{|}{Si}}O)_2-H$$

as the hydroxyl group-containing polysiloxane with mixing to produce a coating composition.

This coating composition was placed on a glass plate, formed into a 20 mm-diameter×5 mm-high cylinder and maintained in a 250° C. atmosphere for 30 minutes with the glass plate held in a vertical position. The cured gel remained at the position of application of the initial composition. For comparison, the same experiment was carried out on a composition lacking the above-mentioned polysiloxane. The cylinder was found to have moved 15 mm down from the position it occupied prior to curing. Both cured compositions had penetration values of 22–23 mm.

That which is claimed is:

1. A curable thixotropic, liquid polyorganosiloxane composition comprising the product obtained by mixing (A) a polyorganosiloxane containing at least two vinyl radicals per molecule and represented by the average unit formula $$R_aSiO_{(4-a)/2},$$

where at least 50 mole % of the radicals represented by R are methyl, the remainder being selected from the group consisting of unsubstituted monovalent hydrocarbon radicals other than methyl, alkoxy and substituted monovalent hydrocarbon radicals where the substituent is selected from the group consisting of acryloxy, methacryloxy, chlorine and fluorine, and the value of a is from 1.8 to 2.2, inclusive;

(B) a polyorganosiloxane containing at least two silicon-bonded nitrogen atoms per molecule and represented by the average unit formula $$R_b^1SiO_{(4-b)/2},$$

where $R^1$ is selected from the group consisting of unsubstituted monovalent hydrocarbon radicals, hydrogen, alkoxy, and substituted monovalent hydrocarbon radicals wherein the substituent is selected from acryloxy, methacryloxy, chlorine, and fluorine, the value of b is from 1.5 to 2.5, inclusive, and the molar ratio of silicon-bonded hydrogen atoms in (B) to vinyl radicals in (A) is from 0.2 to 5, inclusive;

(C) an amount of a platinum-containing catalyst equivalent to from 0.1 to 200 parts by weight of platinum per million parts of combined weight of (A) and (B);

(D) from 0.5 to 50 weight %, based on the combined weight of (A) and (B), of fine silica powder; and (E) from 0.05 to 10 weight %, based on the combined weight of ingredients (A) through (D), of a polyorganosiloxane containing at least 0.5 weight percent of hydroxyl groups per molecule and represented by the average unit formula $$R_c^2SiO_{(4-c)/2},$$

where the value of c is from 1.8 to 3.0, $R^2$ is selected from the group consisting of monovalent hydrocarbon radicals, methoxy, ethoxy, substituted alkyl radicals wherein the substituent is, in turn, selected from the group consisting of chlorine, fluorine, and hydroxyl, and radicals of the formula $$-R^3(OC_2H_4)_x(OC_3H_6)_yOH,$$

where $R^3$ is alkylene, and the values of x and y are from 0 to 30, inclusive, with the proviso that the sum of x and y is at least 1, and that (E) contains a number of silicon-bonded hydroxyl groups sufficient to provide a total of at least 0.5 percent by weight of hydroxyl groups per molecule of (E) in combination with any hydroxyl groups present in $R^2$;

wherein said composition cures to form a gel exhibiting a penetration of from 8 to 50 mm.

2. A composition according to claim 1 where at least 70% of R is methyl.

3. A composition according to claim 1 where ingredient (A) is a dimethylvinylsiloxy-endblocked polydiorganosiloxane.

4. A composition according to claim 1 where the viscosity of ingredient (A) is from 0.05 to 50 Pa·s at 25° C.

5. A composition according to claim 1 where at least 50 mol % of $R^1$ is methyl.

6. A composition according to claim 1 where ingredient (B) is a dimethylsiloxane-methylhydrogensiloxane copolymer or a dimethylhydrogensiloxy endblocked polydimethylsiloxane.

7. A composition according to claim 1 where the viscosity of ingredient (B) is from 0.001 to 50 Pa·s at 25° C.

8. A composition according to claim 1 where the composition of ingredient (B) is sufficient to provide one silicon-bonded hydrogen atom per vinyl radical present in ingredient (A) when ingredient (A) contains two vinyl groups per molecule and ingredient (B) contains two silicon-bonded hydrogen atoms per molecule.

9. A composition according to claim 1 where the concentration of ingredient (B) is sufficient to provide from 0.2 to 0.8 silicon-bonded hydrogen atom per vinyl radical present in ingredient (A) when ingredient (A) contains two vinyl radicals per molecule and ingredient (B) contains at least three silicon-bonded hydrogen atoms per molecule.

10. A composition according to claim 1 where the concentration of ingredient (B) is sufficient to provide from 1.3 to 5 silicon-bonded hydrogen atoms per vinyl radical present in ingredient (A) when ingredient (A) contains at least three vinyl radicals per molecule and ingredient (B) contains two silicon-bonded hydrogen atoms per molecule.

11. A composition according to claim 1 where the fine silica powder is hydrophobicized.

12. A composition according to claim 1 where ingredient (E) exhibits a general formula selected from the group consisting of

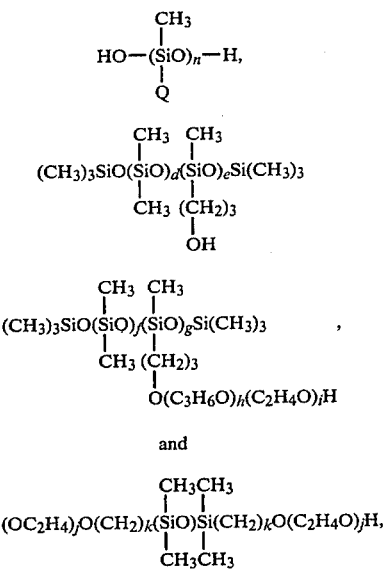

where n is an integer from 1 to 90, inclusive. Q is methyl, phenyl, vinyl, or 3,3,3-trifluoropropyl, d, e, f, and g are each integers from 1 to 500, inclusive, h and i are integers from 0 to 30, with the proviso that the sum of h and i is at least 1, j and k are integers from 1 to 30, inclusive, and 1 is an integer from 1 to 90, inclusive.

* * * * *

UNITED STATES PATENT AND TRADEMARK OFFICE
CERTIFICATE OF CORRECTION

PATENT NO. : 4,477,626

DATED : October 16, 1984

INVENTOR(S) : Toshio Suzuki

It is certified that error appears in the above-identified patent and that said Letters Patent is hereby corrected as shown below:

Col. 2, lines 14-15 - Delete "monovalent" immediately preceding the word "unsubstituted"

Col. 10, line 2 - Delete "nitrogen" and substitute therefor --- hydrogen --- .

Signed and Sealed this

Twenty-fourth Day of September 1985

[SEAL]

Attest:

DONALD J. QUIGG

Attesting Officer

Commissioner of Patents and
Trademarks—Designate